Dec. 20, 1966   E. G. GREGORY   3,292,673
POWER OPERATED PORTABLE HAND SAW
Filed Aug. 27, 1963   4 Sheets-Sheet 1

INVENTOR.
EDWARD G. GREGORY.
BY D. Emmett Thompson
HIS ATTORNEY.

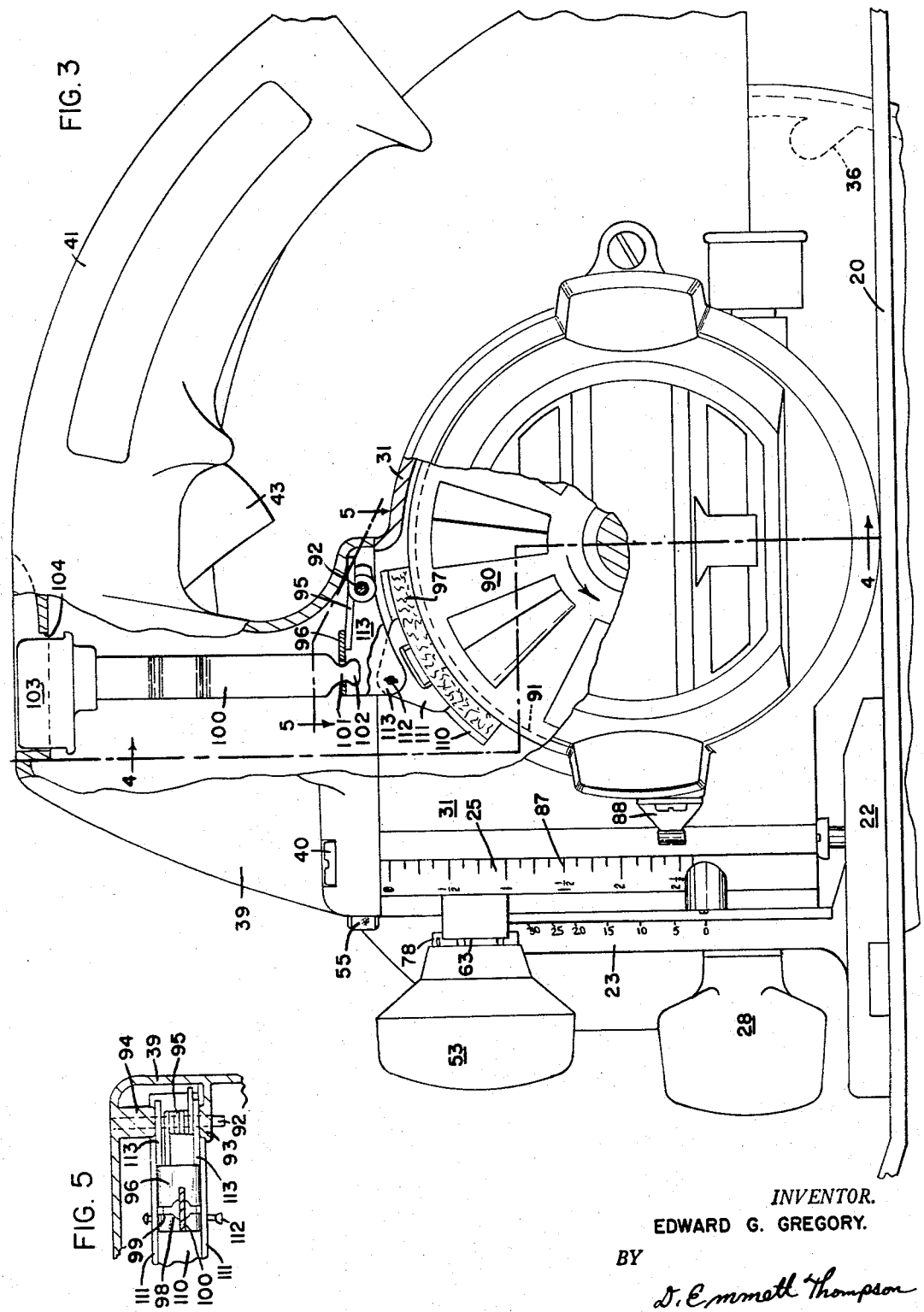

Dec. 20, 1966     E. G. GREGORY     3,292,673
POWER OPERATED PORTABLE HAND SAW
Filed Aug. 27, 1963     4 Sheets-Sheet 3
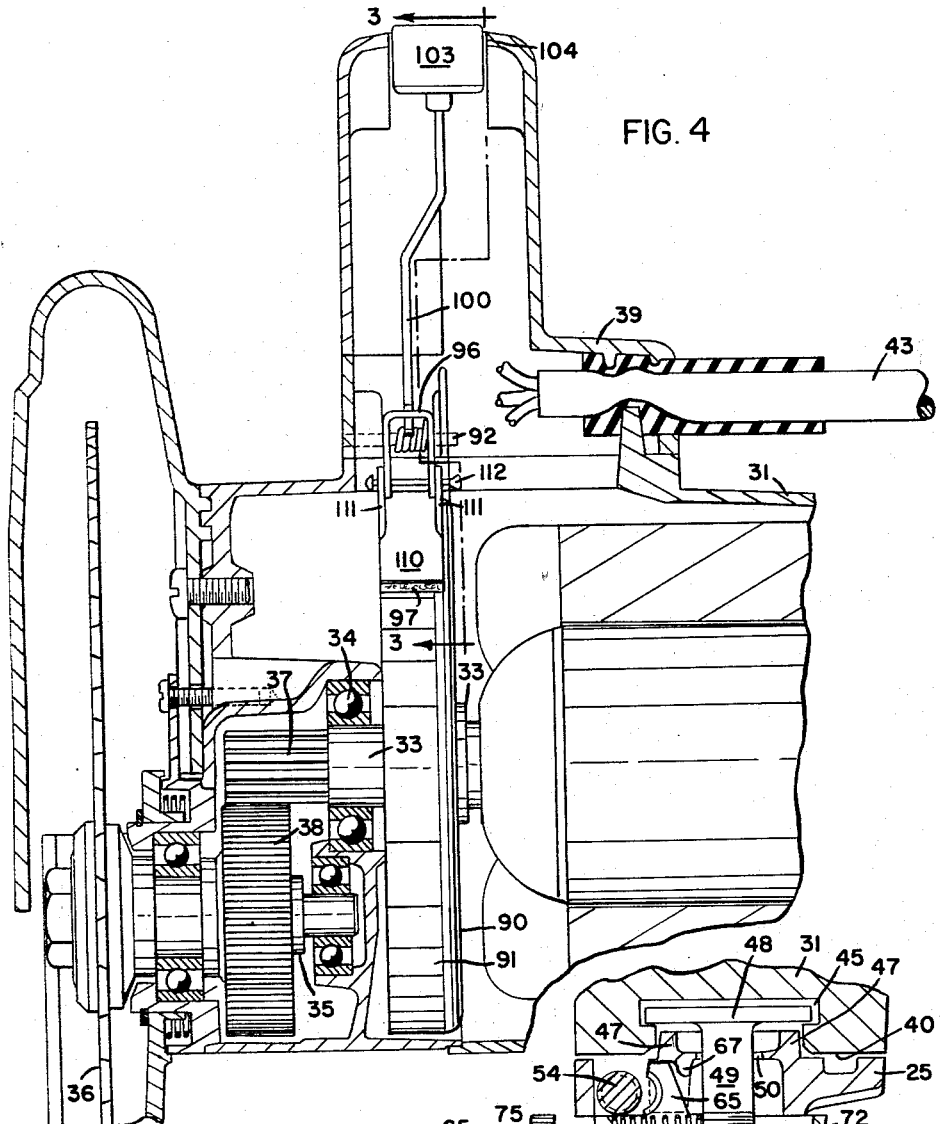
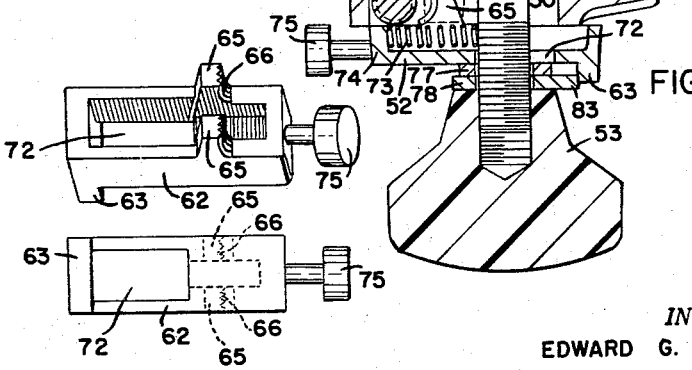
INVENTOR.
EDWARD G. GREGORY.
BY
D. Emmett Thompson
HIS ATTORNEY.

Dec. 20, 1966  E. G. GREGORY  3,292,673
POWER OPERATED PORTABLE HAND SAW
Filed Aug. 27, 1963  4 Sheets-Sheet 4

INVENTOR.
EDWARD G. GREGORY.
BY
*D. Emmett Thompson*
HIS ATTORNEY.

United States Patent Office 3,292,673
Patented Dec. 20, 1966

3,292,673
POWER OPERATED PORTABLE HAND SAW
Edward G. Gregory, North Syracuse, N.Y., assignor to Rockwell Manufacturing Company, Pittsburgh, Pa.
Filed Aug. 27, 1963, Ser. No. 304,890
9 Claims. (Cl. 143—43)

This invention relates to portable power operated hand saws of the type employing a circular saw blade. In general, these saws consist of a base plate adapted to be positioned on and moved along the surface of a work piece, and a housing mounted on the base plate in which a saw blade arbor is journalled together with an electric motor for rotating the arbor and blade. The arrangement provides for adjusting the housing vertically toward and from the base plate to vary the extent to which the exposed portion of the saw blade extends below the base plate. This adjustment accordingly varies the depth of the cut produced by the rotating saw blade in the work piece. A saw of this type is disclosed in Patent No. 1,848,330, issued March 8, 1832, to Arthur N. Emmons.

This invention has as an object a structural arrangement operable in a particularly quick and convenient manner to provide for free movement of the housing relative to the base plate throughout the entire range of adjustment, and to also provide for the very fine and accurate adjustment of the housing relative to the base plate.

Such power operated hand saws are bodily manually manipulated and, to make the machine compact and light in weight, they are powered by a universal type motor, the armature structure of which rotates at high speed. The motor armature is usually connected to the saw arbor through reduction gearing. In order to conserve power, and reduce maintenance to a minimum, the rotating parts of the machine are journalled in anti-friction bearings.

With this arrangement, when the power is interrupted to the motor, the high speed of the rotating saw blade, and the very high speed of the rotating armature, results in these parts having considerable momentum. Accordingly, they continue to rotate for several seconds after the power is interrupted to the motor. This long coasting of the saw blade is objectionable in that, on occasion, it has caused accidents and it necessitates the operator waiting for the saw blade to cease rotating before making another cut.

This invention has as a further object a portable power operated saw of the type referred to embodying a particularly simple and efficient brake mechanism conveniently applied by the operator and effective to stop rotation of the saw blade in a matter of two or three seconds.

The invention consists in the novel features and in the combinations and constructions hereinafter set forth and claimed.

In describing this invention, reference is had to the accompanying drawings in which like characters designate corresponding parts in all the views.

In the drawings:

FIGURE 3 is an end elevational view looking to the left FIGURE 1, with a portion of the housing broken away and parts in section, the sectional portion taken on a line corresponding to line 3—3, FIGURE 4.

FIGURE 4 is a transverse sectional view taken on a line corresponding to line 4—4, FIGURE 3.

FIGURE 5 is a partial sectional view taken on line 5—5, FIGURE 3.

FIGURE 6 is a view similar to FIGURE 2 with a clamping member rotated in retrograde direction from tight position to a position effecting disengagement of the half nut from the adjusting screw.

FIURE 7 is a bottom plan view of the half nut member.

FIGURE 8 is a view in perspective of the half nut in FIGURE 7.

Figure 9:
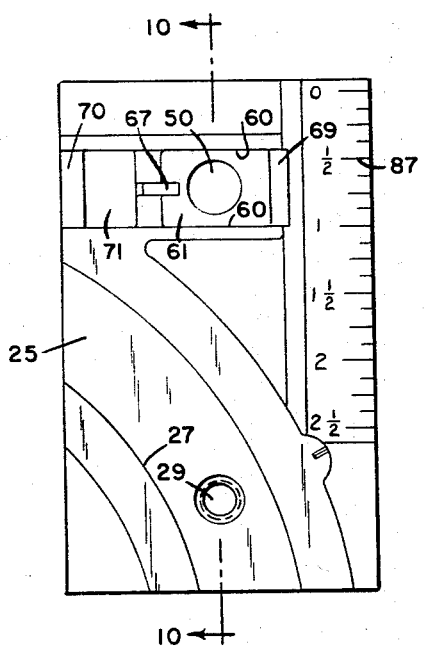

FIGURE 9 is a front elevational view of the support member, and

Figure 10:
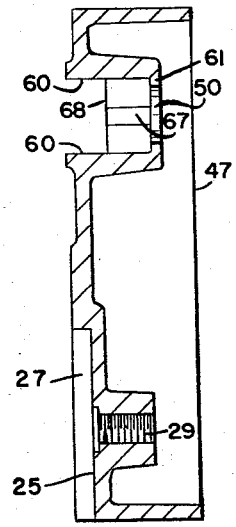

FIGURE 10 is a view taken on line 10—10, FIGURE 9.

Referring to the general arrangement of the machine, 20 designates a base plate which is adapted to be moved along the surface of a work piece. A support structure is fixedly secured to the forward end of the base plate 20. In the embodiment shown, this support consists of two members, one consisting of a base section 22 having an upwardly extending arcuate portion 23 formed with an arcuate slot 24. The second portion of the base consists of a vertically disposed member 25 of generally rectangular form, see FIGURE 9, and being provided with an arcuate slot 27 to receive an arcuate guide formed integral with the member 23. The members 23, 25, are fixedly secured together by a stud 28 extending through the arcuate slot 24 of member 23 and threading into a hole 29 in the member 25.

The purpose of this arrangement is to provide for tilting the saw housing relative to the base 20 about a horizontal axis for effecting angular cuts in the work piece. This portion of the structure is more completely described in the Emmons Patent No. 1,848,330, previously referred to.

The saw proper consists of a housing 31 in which the electric motor is mounted, the armature shaft 33 of which is journalled in ball bearings, one being shown at 34 in FIGURE 4. A saw arbor 35 is journalled in the housing and has an exposed portion to which the circular saw blade 36 is attached in the usual manner, see FIGURE 4. The armature shaft 33 is formed, or provided, with a pinion gear 37 arranged in mesh with a spur gear 38 fixed to the arbor 35.

The machine is provided with a handle for its manipulation, this handle comprising an upwardly extending base portion 39 attached to the housing, as by screws 40, and a rearwardly extending hand grip portion 41. A switch is mounted in the hand grip portion 41 and is provided with a trigger actuator 43. This switch serves to connect and disconnect the motor from the power supply which is provided by a power cord 43 entering the base section 39 of the handle.

The housing 31 and the support 25 have a slidable interlocking engagement to permit vertical adjustment of the housing relative to the support 25 and the base 20. In the arrangement shown, the forward end of the housing 31 is provided with a surface 40 formed with a vertically disposed T slot 45 formed therein. See FIGURES 2 and 6. The surface of the member 25 confronting the surface 40 of the housing is formed with ribs 47 slidably mounted in the outer portion of the T slot.

A clamping structure is provided for fixedly clamping the housing 31 to the support member 25. The clamping structure may take the form of a T head bolt, the head 48 of which is slidably mounted in the T slot 45 (see FIGURES 2 and 6), and a stem portion 49 extends outwardly through an aperture 50 formed in the member 25.

The housing and support are clamped into fixed engagement by turning a hand nut or knob 53 threaded on the outer end of the stem portion 49 of the T head bolt. Reverse rotation of the knob 53 unclamps the housing from the support, as will be apparent.

Figure 1:
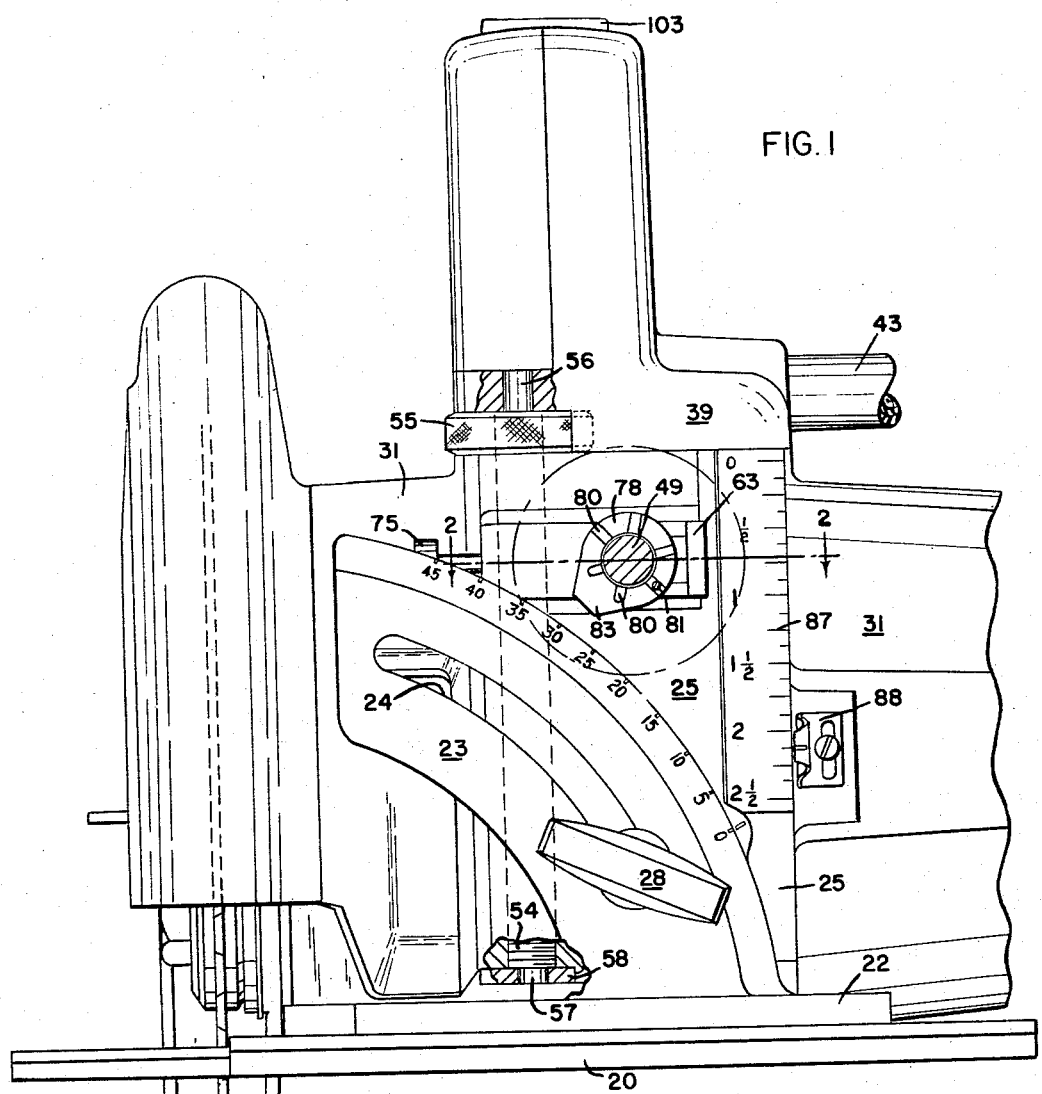
FIGURE 1 is a front elevational view of a portable saw embodying my invention.
Figure 2:
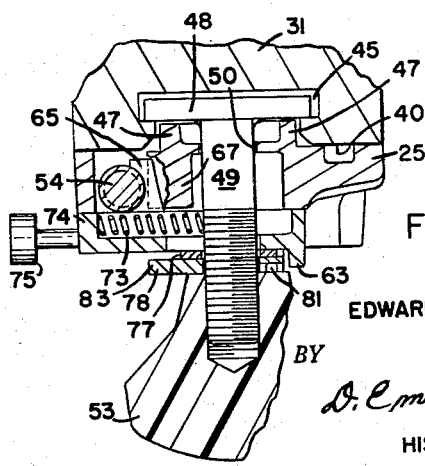
FIGURE 2 is a partial sectional view taken on line 2—2, FIGURE 1.

An adjusting screw 54 is vertically disposed in front of the surface 40 at one side of the T slot 45, see FIGURES 2 and 6, and is provided at its upper end with an enlarged cylindrical portion 55, and with a trunnion 56 extending upwardly therefrom, see FIGURE 1. The trunnion 56 is journalled in an aperture formed in the base 39 of the handle. The base portion 39 of the handle extends forwardly of the surface 40 and terminates substantially flush with the forward side of the support 25, see FIGURE 3. The lower end of the screw 54 is formed with a trunnion 57 journalled in a plate 58 secured to the lower end of the housing 31. The base portion 39 of the handle structure is apertured to permit a peripheral portion of the enlarged portion 55 of the screw to be accessible, so that the screw may be conveniently rotated.

The support 25 is formed in its upper portion with a transversely extending groove defined by upper and lower wall 60, see FIGURES 9 and 10. The aperture 50 is formed in the bottom wall 61 of this groove. A half nut member shown in FIGURES 7 and 8 is positioned in this groove for movement transversely of the support 25. The half nut consists of a rectangular shaped base portion 62 having an outwardly extending flange 63 at one end. Intermediate its ends, the base portion is formed with spaced apart rearwardly extending projection 65. Like sides of these projections are formed with curved surfaces provided with threads 66 comparable to the threads on the adjustment screw 54.

The support member 25 is formed with a rib 67 extending forwardly from the bottom wall 61. The outer end or edge of the rib 67 terminates in a plane 68, see FIGURE 10, in which are located surfaces 69, 70 at the ends of the groove. The half nut is positioned in the groove on the surfaces 69, 70 and with the threaded projections 65 extending rearwardly and straddling the rib 67. The support member 25 is formed with a rectangularly shaped aperture 71, located at the side of the rib 67 opposite to the aperture 50. The end flange 63 of the half nut extends forwardly as shown in the views, FIGURES 2 and 6. The half nut is formed with a rectangular opening 72 elongated in a direction lengthwise of the base 62. The stem 49 of the T bolt extends through this aperture 72. A helical compression spring 73 is interposed between the stem 49 and the end 74 of the half nut urging the half nut to the left FIGURES 2 and 6, to move the projection 65 into threaded engagement with the adjusting screw 54, as shown in FIGURE 2.

Means is provided externally of the support 25 for moving the half nut out of engagement with the adjusting screw 54 to provide for quick and full adjustment of the housing vertically relative to the support when these members are in unclamped relation. The half nut may be provided with a knob or finger piece 75 projecting outwardly from the support 25, FIGURES 2 and 6, by which the half nut may be conveniently moved out of engagement with the adjusting screw 54 against the action of the spring 73. With the half nut thus disengaged, and the housing 31 unclamped from the support, the housing may be adjusted to any degree within the range of the relative movement between the housing and support.

To avoid such separate manipulation of the half nut, an arrangement may be employed whereby, upon reverse movement of the knob 53, the half nut is moved out of engagement with the screw 54. Such an arrangement is shown in FIGURES 1, 2 and 6.

A washer 77 is positioned on the stem 49 overlying the outer surface of the half nut. A cam member 78 is positioned on the stem 49 intermediate the washer 77 and the hand knob 53. The outer surface of the cam member 78, confronting the inner end of the hand nut 53, is formed with a plurality of radially extending slots 80, and the clamping nut 53 is provided with a pin 81. The pin 81 is positioned in one of the slots 80. A slot is selected so when the clamping nut 53 is tightened on the stem 49 to clamp the support 25 fixedly against the housing 31, the lobe or high portion 83 of the cam is approximately in the position shown in FIGURE 1 of the drawing.

When the clamping nut 53 is turned from tight position in reverse direction, that is, counter-clockwise FIGURE 1, the support 25 is unclamped from the housing 31. However, the lobe 83 of the cam has not been moved into engagement with the flange 63 of the half nut. With the components in this position, the housing may be adjusted vertically relative to the support 25 by rotating the adjusting screw 54 by the knurled portion 55. Due to the fact that the threaded projections 65 of the half nut are now in engagement with the adjusting screw 54, rotation of the screw will effect vertical adjustment of the housing relative to the support.

When the clamping nut 53 is rotated further in a reverse direction, the lobe section 83 of the cam is moved into engagement with the flange 63 of the half nut, moving the half nut to the right as shown in FIGURE 6, moving the threaded portions 65 of the nut out of engagement with the screw 54. With the support being unclamped from the housing 31 and the half nut out of engagement with the adjusting screw 54, the housing may be now adjusted vertically by simply manually moving the housing up and down relative to the base plate 20. This provides for quick approximate adjustment of the depth of the saw cut. To aid in such quick adjustment, the right side of the support member 25 is provided with graduations 87, see FIGURES 1 and 9. An adjustable pointer 88, see FIGURE 1, is fixedly secured to the saw housing 31.

When this quick adjustment is made, the clamping nut 53 is turned slightly toward clamping position, thereby moving the lobe 83 of the cam out of engagement with the flange 63 of the half nut, permitting the threaded portions 65 thereof to engage the adjusting screw 54. Thereupon, by manipulation of the screw 54, a fine accurate adjustment between the support and housing can be readily obtained and when this happens, the clamp nut 53 is turned further to the right, FIGURE 1, clamping the housing fixedly to the support 25.

With this arrangement, the clamping and unclamping of the housing and support and the manipulation of the half nut is effected by rotation of the knob 53. Usually the operator grasps the handle 41 in one hand and manipulates the knob 53 with the other hand whereby the quick adjustment can be made without removing the hands from the saw.

A cooling fan 90 is fixedly secured to the armature shaft 33 and is formed with a cylindrical flange 91 at its periphery. The fan is located in the housing below the base section 39 of the handle. A channel shaped yoke is mounted at one end on a pivot pin 92 carried by bosses 93, 94 formed on the inner surface of the base portion 39 of the handle, see FIGURES 3 and 5. The pin 92 extends through apertures formed in the sides 113 of the channel member. A torsion spring 95 is positioned on the pin 92 intermediate the side walls 113 of the channel member, one end of the spring engaging the handle base 39 and the opposite end acting against the top wall 96 of the channel member. A brake shoe 97, of friction material, is fixedly secured to the channel member and is positioned to engage the cylindrical flange 91 of fan 90 when the channel member is moved downwardly against the action of spring 95.

The top wall 96 of the channel member is formed with a circular aperture 98 and with a slot 99 extending transversely of the top wall through the aperture 98, see FIGURE 5. An actuating stem 100 is vertically disposed in the handle base 39. This stem is formed of a flat metal strip having considerably greater width than thickness. The lower end of the stem is formed with a neck portion 101 which terminates in a rounded end portion 102. The neck portion 101 is wider than the slot 99, but is something slightly less in width than the diameter of the aperture 98. The end portion 102, however, is substantially wider than the diameter of the aperture 98.

In assembling the actuating stem to the brake shoe, the stem is turned 90° from the position shown in the drawings, that is, with the width of the stem extending parallel to the slot 98. The end 102 is then inserted through the slot and the stem is turned to the position shown in the drawings wherein the end portion extends transversely of the slot with the neck portion 101 in the aperture 98. With this arrangement, relative movement between the stem and the brake shoe is limited in the vertical direction and movement of the lower end of the stem transversely of the channel member is limited because the neck portion 101 is positioned in the aperture 98, as shown in FIGURE 3.

The upper end of the stem is provided with a thumb button 103 of non-circular form positioned in a non-circular aperture 104 formed in the top wall of the handle base 39. The button 103 is readily accessible for depression by the thumb of the operator and upon being depressed, effects actuation of the brake shoe into frictional engagement with the cylindrical flange 91 of the fan 90.

The fan 90 rotates in a counterclockwise direction, FIGURE 3. Upon movement of the brake shoe 97 into engagement with the flange of the fan, a braking action is applied thereto to resist rotation of the armature shaft and the saw blade 36 through the gearing 37, 38.

To provide proper engagement between the brake shoe 97 and the fan flange, the brake shoe is fixedly secured to a sheet metal backing member 110 of arcuate form. The backing member 110 is formed, at its side edges and intermediate its ends, with bent up ear portions 111 apertured to receive a pin 112 which extends through the side walls 113 of the channel yoke.

It will be noted that the braking effort of the instant invention is applied to the periphery of the fan and therefore acts at a greater radius than if the braking effort were applied directly to the armature shaft 33 as is conventional in prior art devices of this nature. This has two effects. First, the lever arm of the braking effort in the instant invention is greater which results in a greater braking torque for a given pressure on the brake. Secondly, the braking effort is applied to the fan member around which the flow of air is greatest whereby the dissipation of the heat generated by the braking action is greatly facilitated. Both effects combine to produce a brake whereby the tool may be easily, quickly and frequently stopped by the application of less pressure than in the prior art devices.

The parts are so proportioned and arranged that moderate pressure by the thumb on the button 103 will quickly bring the rotating parts of the saw to a standstill.

What I claim is:

1. A power operated portable hand saw comprising a base plate, a support member extending upwardly from said base plate, a motor housing having a surface slidably engaging said support for vertical movement of the housing relative to said support, a clamping structure carried by said support and including an actuating hand knob located exteriorly of said support, said clamping structure being operable upon rotation of said knob in one direction to clamp said housing to said support and upon reverse rotation of said knob to unclamp said housing from said support, an adjusting screw carried by said housing and being journalled for rotation about a vertical axis, a half nut mounted in said support for movement in a direction transversely of said screw into and out of threaded engagement therewith, said screw being operable upon rotational engagement with said half nut to effect vertical movement of said housing relative to said support when the same are in unclamped relation, and means operable exteriorly of said support for moving said half nut out of engagement with said screw.

2. A power operated portable hand saw comprising a base plate, a support member extending upwardly from said base plate, a motor housing having a surface slidably engaging said support for vertical movement of the housing relative to said support, a clamping structure carried by said support and including an actuating hand knob located exteriorly of said support, said clamping structure being operable upon rotation of said knob in one direction to clamp said housing to said support and upon reverse rotation of said knob to unclamp said housing from said support, an adjusting screw carried by said housing and being journalled for rotation about a vertical axis, a half nut mounted in said support for movement in a direction transversely of said screw into and out of threaded engagement therewith, said screw being operable upon rotational engagement with said half nut to effect vertical movement of said housing relative to said support when the same are in unclamped relation, and means operable upon reverse rotation of said knob to move said half nut out of engagement with said screw.

3. A power operated portable hand saw comprising a base plate, a support member extending upwardly from said base plate, a motor housing having a surface slidably engaging said support for vertical movement of the housing relative to said support, a clamping structure carried by said support and including an actuating hand knob located exteriorly of said support, said clamping structure being operable upon rotation of said knob in one direction to clamp said housing to said support and upon reverse rotation of said knob to unclamp said housing from said support, an adjusting screw carried by said housing and being journalled for rotation about a vertical axis, a half nut mounted in said support for movement in a direction transversely of said screw into and out of threaded engagement therewith, said screw being operable upon rotational engagement with said half nut to effect vertical movement of said housing relative to said support when the same are in unclamped relation, a cam member connected to said knob and being operable upon reverse rotation of said knob to move said half nut out of engagement with said screw.

4. A power operated portable hand saw comprising a base plate, a support member extending upwardly from said base plate, a motor housing having a surface slidably engaging said support for vertical movement of the housing relative to said support, said surface being formed with a vertically extending T slot, a clamping structure carried by said support including a member positioned in said T slot, a stem extending outwardly from said member through an aperture in said support and a hand knob mounted on the outer end of said stem, said member, stem and knob being conjunctively operable upon rotation of said knob in one direction to clamp said housing fixedly to said support and upon reverse rotation of said knob to unclamp said housing from said support, an adjusting screw carried by said housing and being journalled for rotation about a vertical axis, a half nut mounted in said support for movement in a direction transversely of said screw into and out of threaded engagement therewith, said screw being operable upon rotational engagement with said half nut to effect vertical movement of said housing relative to said support when the same are in unclamped relation, and means operable upon further reverse rotation of said knob from unclamped position to move said half nut out of engagement with said screw.

5. A power operated portable hand saw comprising a base plate, a support member extending upwardly from said base plate, a motor housing having a surface slidably engaging said support for vertical movement of the housing relative to said base plate, said surface being formed with a vertically extending T slot, a T head bolt having the head portion thereof positioned in said T slot and a stem portion extending outwardly through an aperture in said support, a hand piece threaded on the outer end of said bolt and being operable when turned from unclamped position to tight position to clamp said housing on support in fixed relation, an adjusting screw carried by said housing and being journalled for rotation about a vertical axis, a half nut mounted in said support for movement in a direction transversely of said screw into and out of threaded engagement therewith, spring means urging said half nut in engagement with said screw, said screw being operable upon rotational engagement with said half nut to move said housing vertically relative to said support, a cam member rotatably mounted on the stem of said T bolt and being operatively connected to said hand piece for rotation therewith, said cam member being operable when said hand piece is turned in further retrograde direction from unclamped position to a third position to move said half nut out of engagement with said screw whereby to provide for the free vertical movement of said housing relative to said support.

6. A power operated portable hand saw comprising a base plate, a support member extending upwardly from said base plate, a motor housing having a surface slidably engaging said support for vertical movement of the housing relative to said base plate, said surface being formed with a vertically extending T slot, a T head bolt having a head portion positioned in said T slot and a stem portion extending outwardly through an aperture in said support, a hand piece member threaded on the outer end of said bolt, and when turned to tight position being operable to clamp said housing and support in fixed relation, an adjusting screw carried by said housing and being journalled for rotation about a vertical axis, a half nut mounted in said support for movement in a direction transversely of said screw into and out of threaded engagement therewith, spring means urging said half nut in engagement with said screw, said hand piece member being turnable in retrograde direction from tight position to unclamped position and said adjusting screw being operable upon rotation when said hand piece member is in unclamped position to move said housing vertically relative to said support, a cam member rotatably mounted on the stem of said T bolt in confronting relation to said hand piece member, the confronting surface of one of said members being formed with a plurality of radially extending slots and the other of said members being provided with a pin for selective engagement with one of said slots to effect rotation of said cam member by said hand piece member, said cam member being operable when said hand piece member is turned in retrograde direction from said unclamped position to a third position to move said half nut out of engagement with said screw to provide for the free vertical movement of said housing relative to said support.

7. A power operated portable circular hand saw comprising a housing, a motor mounted in the housing and including a rotating armature shaft, a saw blade arbor journalled in the housing and being operatively connected with said shaft, a saw blade fixed on said arbor, a handle attached to said housing, a member fixedly secured to said armature shaft and being rotatable therewith, said handle including a base portion extending upwardly from the housing above said member and a hand grip portion extending rearwardly from said base portion, brake means including a brake shoe mounted in the housing for movement into and out of braking engagement with said member, a stem disposed in the base section of said handle for vertical sliding movement therein and being operable upon downward movement to move said brake shoe into braking engagement with said member, spring means urging said brake shoe out of engagement with said member and the upper end of said stem being accessible through the top of the base section of said handle for depression by the thumb of the operator, and a switch for said motor on said handle operating independently of said brake means.

8. A power operated portable circular hand saw comprising a housing, a motor mounted in the housing and including a rotating armature shaft, a saw blade arbor journalled in the housing and being operatively connected with said shaft, a handle attached to said housing, a cooling fan fixedly mounted on said shaft and having a cylindrical peripheral flange, said handle including a base portion extending upwardly from the housing above said fan, and a hand grip portion extending rearwardly from said base portion, a brake shoe pivotly mounted in the housing for movement into and out of braking engagement with said fan flange, a stem vertically disposed in the base section of said handle the upper end of said stem having a thumb engaging knob slidably mounted in the handle and being accessible through the top thereof, the lower end of said stem being detachably secured to said brake shoe, said stem being operable upon downward movement to move said brake shoe into engagement with the upper portion of said flange, and spring means urging said brake shoe upwardly from said flange.

9. A power operated portable hand saw comprising a base plate, a support member extending upwardly from said base plate, a motor housing member having a surface slidably engaging said support member for movement of the housing member relative to said support member, an adjusting screw carried by one of said members and being journalled therein for rotation about its longitudinal axis, a thread engaging element mounted in the other of said members for movement in a direction transversely of said screw into and out of threaded engagement therewith, said screw being operable upon rotational engagement with said thread engaging element to effect movement of said housing member relative to said support member, and means manually operable to move said thread engaging element out of engagement with said screw, clamping means independent of said thread engaging element and carried by said support member and being manually operable to clamp said housing member to said support member.

References Cited by the Examiner

UNITED STATES PATENTS

| | | | |
|---|---|---|---|
| 531,427 | 12/1894 | Roche | 143—47 |
| 1,811,577 | 6/1931 | Crowe. | |
| 1,848,330 | 3/1932 | Emmons | 143—43 |
| 2,151,274 | 3/1939 | Hindman | 143—17.3 |
| 2,823,325 | 2/1958 | Stephan | 188—264 |
| 2,898,956 | 8/1959 | Zern | 143—17.3 |
| 2,955,629 | 10/1960 | Bork | 143—43 |
| 2,984,286 | 5/1961 | Vuichard. | |
| 3,224,474 | 12/1965 | Bloom | 143—43 |

FOREIGN PATENTS 509,364   10/1930   Germany.

HAROLD D. WHITEHEAD, *Primary Examiner.*

WILLIAM W. DYER, JR., *Examiner.*